US006976010B2

(12) United States Patent
Banerjee et al.

(10) Patent No.: US 6,976,010 B2
(45) Date of Patent: Dec. 13, 2005

(54) METHOD FOR SYNDICATING ONLINE CONTENT

(75) Inventors: Dwip N. Banerjee, Austin, TX (US); Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 09/894,109

(22) Filed: Jun. 28, 2001

(65) Prior Publication Data

US 2003/0004880 A1    Jan. 2, 2003

(51) Int. Cl.[7] ............................ G06F 17/60; H04N 7/16
(52) U.S. Cl. ............................ 705/51; 380/205; 725/1; 725/86
(58) Field of Search ........................ 705/51–54, 57–59, 705/64, 67, 72, 75, 26–27; 380/201–209, 380/231–234; 713/156, 158, 183–185, 200–202; 725/1, 5, 9–11, 25–36, 39–53, 58–61, 86–88, 725/104, 135

(56) References Cited

U.S. PATENT DOCUMENTS

| | | | |
|---|---|---|---|
| 5,311,423 A | * | 5/1994 | Clark ............................. 705/8 |
| 5,425,100 A | * | 6/1995 | Thomas et al. ................ 725/20 |
| 5,594,902 A | * | 1/1997 | Nishigaya et al. ........... 718/102 |
| 5,706,507 A | | 1/1998 | Schloss ........................ 395/615 |
| 5,708,780 A | | 1/1998 | Levergood et al. ..... 395/200.12 |
| 5,835,843 A | * | 11/1998 | Haddad ........................ 725/115 |
| 5,920,701 A | * | 7/1999 | Miller et al. ................. 709/228 |
| 5,926,798 A | | 7/1999 | Carter .......................... 705/26 |
| 6,085,235 A | | 7/2000 | Clarke et al. ................ 709/219 |
| 6,094,680 A | | 7/2000 | Hokanson .................... 709/223 |
| 6,119,163 A | | 9/2000 | Monteiro et al. ............ 709/227 |
| 6,122,658 A | | 9/2000 | Chaddha ...................... 709/223 |
| 6,138,142 A | | 10/2000 | Linsk ........................... 709/203 |
| 6,141,754 A | | 10/2000 | Choy ........................... 713/200 |

(Continued)

FOREIGN PATENT DOCUMENTS

WO    WO 3038695 A1 *  5/2003  ........... G06F 17/60

OTHER PUBLICATIONS

Jacobs, Paula, "Online Syndication Still a Dream for Most", Internet week, pp 41-42, Apr. 10, 2000, ISSN: 1096-9969.*

Primary Examiner—James P. Trammell
Assistant Examiner—Mary Cheung
(74) Attorney, Agent, or Firm—Mark S. Walker; Streets & Steele; Frank J. Campigotto

(57) ABSTRACT

A method and system for making available syndicated content on-line from a variety of content providers while enforcing the exclusivity requirements for each of the content providers. The method prevents conflict between the exclusivity requirements, expressed as distribution parameters, of the different content providers by examining the proposed distribution parameters before the content is accepted for distribution. New content is rejected if its distribution parameters are in conflict with the existing content. The content is distributed to a purchaser if there are no conflicts between the distribution parameters for the requested contents and purchaser properties. Purchaser properties may include such items of information as purchaser identification, geographical location, income, age, business classification, demography or combinations thereof. By comparing the personal properties with the distribution parameters, the content controller server can determine whether the purchaser is qualified to view the requested content.

54 Claims, 5 Drawing Sheets

U.S. PATENT DOCUMENTS

| | | | |
|---|---|---|---|
| 6,151,631 A * | 11/2000 | Ansell et al. | 709/229 |
| 6,173,322 B1 | 1/2001 | Hu | 709/224 |
| 6,189,033 B1 | 2/2001 | Jin et al. | 709/225 |
| 6,209,028 B1 * | 3/2001 | Walker et al. | 709/219 |
| 6,507,953 B1 * | 1/2003 | Horlander et al. | 725/105 |
| 6,526,575 B1 * | 2/2003 | McCoy et al. | 725/36 |

* cited by examiner

METHOD FOR SYNDICATING ONLINE CONTENT

BACKGROUND OF THE INVENTION

1. Field of the Invention

The present invention relates to a method and system for managing online content distribution, and more particularly, to a method and system for distributing online content while enforcing exclusivity agreements with other online content providers.

2. Description of the Related Art

The Internet, which started in the late 1960's, is a vast computer network consisting of many smaller networks that span the entire globe. The Internet has grown exponentially since its inception such that now millions of people per day connect to the Internet using both permanent and dial up connections. The computers, or networks of computers connected to the Internet, known as "hosts", allow public access to files, documents and data covering a vast array of content such as entertainment, information for businesses and consumers and online shopping.

The content on the Internet is made available to the public through "servers". A server is a computer system running on an Internet host that makes the server's content, typically stored on magnetic storage devices such as tape drives or fixed disks integral to the host, available to the public. An Internet server distributes the server's contents to a computer requesting the contents though often the contents will not be distributed until the requesting computer provides proof of authorization to receive the information by, for example, providing a password. The requesting computer is known as the "client", which typically is an Internet connected workstation or home personal computer.

TCP/IP (Transmission Control Protocol/Internet Protocol) is one networking protocol that permits full use of the Internet. All computers on a TCP/IP network need unique identification codes so that each computer or host on the Internet is identified by a unique number code, known as the IP address. The World-Wide Web (Web) is a system for accessing information on the Internet that allows a user to navigate the Internet resources intuitively, without knowledge of IP addresses or other technical information. The Web is made up of a multiplicity of Web "pages" that can be displayed on a client's computer monitor when the client's computer is running a Web browser. The Internet servers provide the Web pages from their location on the Web, known as their Web sites.

Business enterprises have found use of the Internet to be quite profitable as it allows business enterprises to reach many customers around the world. Most large companies and many small companies now have Web sites. At first these Web sites were often merely used to advertise a business enterprise's goods and services but now, many business enterprises actually sell their goods and services over the Internet. For example, a consumer may now purchase an automobile, a book, or a vacation over the Internet. An industrial customer may purchase a piece of large equipment or expensive office machines, such as copiers or computers, over the Internet. Some business enterprises have even found it profitable to merely provide a Web site for other businesses to use to sell their goods and services, providing a well advertised Web site for consumers to enter and shop for goods and services from multiple sellers.

The Internet has not, however, provided exclusivity to multiple sellers using a common Web site to offer their goods and services for sale. The concept of exclusivity is well known outside the Internet. For example, a syndicated columnist sells a column appearing daily or weekly only to newspapers or magazines having different geographical areas of distribution. A syndicated columnist selling a syndicated column to one newspaper in New York City will probably not sell the same syndicated column to another newspaper in New York City but instead, may sell the syndicated column to a newspaper in Los Angles. This practice maximizes the syndicated columnist's revenue for selling the syndicated column because the New York City newspaper is willing to pay more for the exclusive right to publish the column in the New York City area than it would be willing to pay without the exclusive geographical right of distribution. The same concept applies to a syndicated television program in the television industry.

Another example of exclusivity of distribution is the broadcasting of sporting events. If a football game is broadcast on television, the game is often blacked out, or not broadcast in the city in which the game is being played, unless all the stadium seats are sold out. This encourages fans wishing to view the game to purchase a seat at the stadium instead of staying home and watching the game on television, thereby maximizing the football team's revenue.

Yet another example of the concept of exclusivity is in the motion picture industry. If a motion picture has been released for viewing to one cable television motion picture provider, or premium channel, it is not simultaneously released to other premium channels. This practice encourages consumers to purchase more than one premium channel, which is of benefit to the motion picture industry, or to purchase only the consumer's perceived best premium channel, which is of benefit to that premium channel.

SUMMARY OF THE INVENTION

The present invention allows content distributors on the Internet to offer exclusive distribution of content from multiple content providers while ensuring that the business plans of the content providers are satisfied. The present invention provides a method for distributing online content to purchasers from a variety of content providers based upon the content's distribution parameters. Further, the present invention prevents conflict between the distribution parameters of the different content providers by examining the proposed distribution parameters before the new content is accepted for distribution to ensure there are no conflicts between the existing distribution parameters and the proposed distribution parameters. If conflicts are found, then the new content is not accepted for distribution unless the proposed distribution parameters are altered to remove the conflicts.

The content that is distributed may be, for example, films, theatrical performances, sporting events, music performances, magazine subscriptions, newspaper subscriptions, newsletters, entertainment, information, video feeds, audio feeds, television broadcasts, radio broadcasts, news reports, or combinations thereof.

The content is distributed to a purchaser based upon the distribution parameters submitted for each of the different contents offered for distribution. These parameters are based upon considerations that may include, for example, pricing of the content for a purchaser, cost of distribution by the content distributor, time period for distribution of the content, geographical areas to distribute or not to distribute the content, the bandwidth over which the content may be distributed, purchaser properties targeted for distribution or blocked from distribution, content description and classification, exclusivity of distribution from competing content providers, and combinations thereof. Purchaser properties are stored in a purchaser database and may include such items of information as purchaser identification, geographical location, income, age, business classification, demography or combinations thereof.

A purchaser views the content by accessing the content controller server over the Internet and providing information to the content controller server to demonstrate that the purchaser is authorized to view the content. This information includes, for example, purchaser properties, credit card number, payment method or combinations thereof. The purchaser may be issued a password and identification that allows the purchaser to login for future content distribution without having to provide the personal information again.

Content may be distributed to a purchaser only if the purchaser is qualified to receive that content based upon the distribution parameters for the requested content. The distribution parameters may include constraints on distribution that would limit distribution to, for example, purchasers of a certain minimum age or purchasers from a certain geographical region. By comparing the personal information stored in the purchaser database with the constraints contained in the distribution parameters, the content controller server can determine whether the purchaser is qualified to view the requested content.

The present invention also ensures that the content offered for distribution does not conflict with the business policies of the content distributor. The content distributors' business policies may be based upon a variety of parameters, for example, copyright law considerations, objectionable content ban, purchaser demand for types of content, cost of distributing content, distribution hardware availability and combinations thereof. The present invention prevents conflict between the distribution parameters of the different content providers and the content distributors' business policy parameters by examining the proposed distribution parameters before the new content is accepted for distribution to ensure there are no conflicts between the content distributor's business policy parameters and the proposed distribution parameters. If conflicts are found, then the new content is not accepted for distribution unless the proposed distribution parameters are altered to remove the conflicts.

The present invention also provides a system for controlling the online content distribution to ensure the content does not conflict with the business policy parameters of the content provider or the distribution parameters of the registered content. The system may include a content controller server, storage facilities for the content to be distributed, a distribution parameter database, a content distributor business policy parameter database and a purchaser database. Alternatively, these databases may be combined into one or more separate databases.

BRIEF DESCRIPTION OF THE DRAWINGS

So that the features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not be considered limiting of its scope, for the invention may admit to other equally effective embodiments.

DETAILED DESCRIPTION

The present invention provides a method for making syndicated content available on-line from a variety of syndicated content providers while enforcing the exclusivity requirements of each of the syndicated content providers. Traditionally, syndicated content is sold or published by many different publishers simultaneously with exclusivity constraints attached. For example, a newspaper in New York City may publish a syndicated column but that same column would not be available to be published by another newspaper in New York City because the first paper purchased the exclusive rights to publish the syndicated column in the New York City area. However, a newspaper in Los Angles could publish the same syndicated column simultaneously with the publication in New York because the publication in Los Angeles would not conflict with the exclusivity requirements of the New York City publication.

In the more modern sense, syndicated content is made available on-line by a content distributor that makes the content available to purchasers only if pre-set exclusivity constraints for distribution are met. These constraints may include, for example, geographical location and time period just as in the traditional sense. If the syndicated content is a live baseball game, the content provider may allow a content distributor to distribute the game to purchasers but only if no other sporting event is being distributed by the content distributor at the same time as the game and only if purchasers from the game's location are not allowed to view the content. The content distributor, therefore, must enforce the exclusivity constraints of the content provider by ensuring there are no other sporting events scheduled for distribution at the same time as the game and to ensure purchasers located in the game's location are not permitted to view the content.

The present invention prevents conflict between the exclusivity requirements, expressed as distribution parameters, of the different content providers by examining the proposed distribution parameters before the content is accepted for distribution. New content is rejected if its distribution parameters are in conflict with the existing content. A potential content provider may be given the opportunity to change its distribution parameters and thereby remove any conflicts with the distribution parameters of the existing content. If changed successfully, then the new material could be accepted by the content distributor and made available for purchasers to view.

Figure 1:
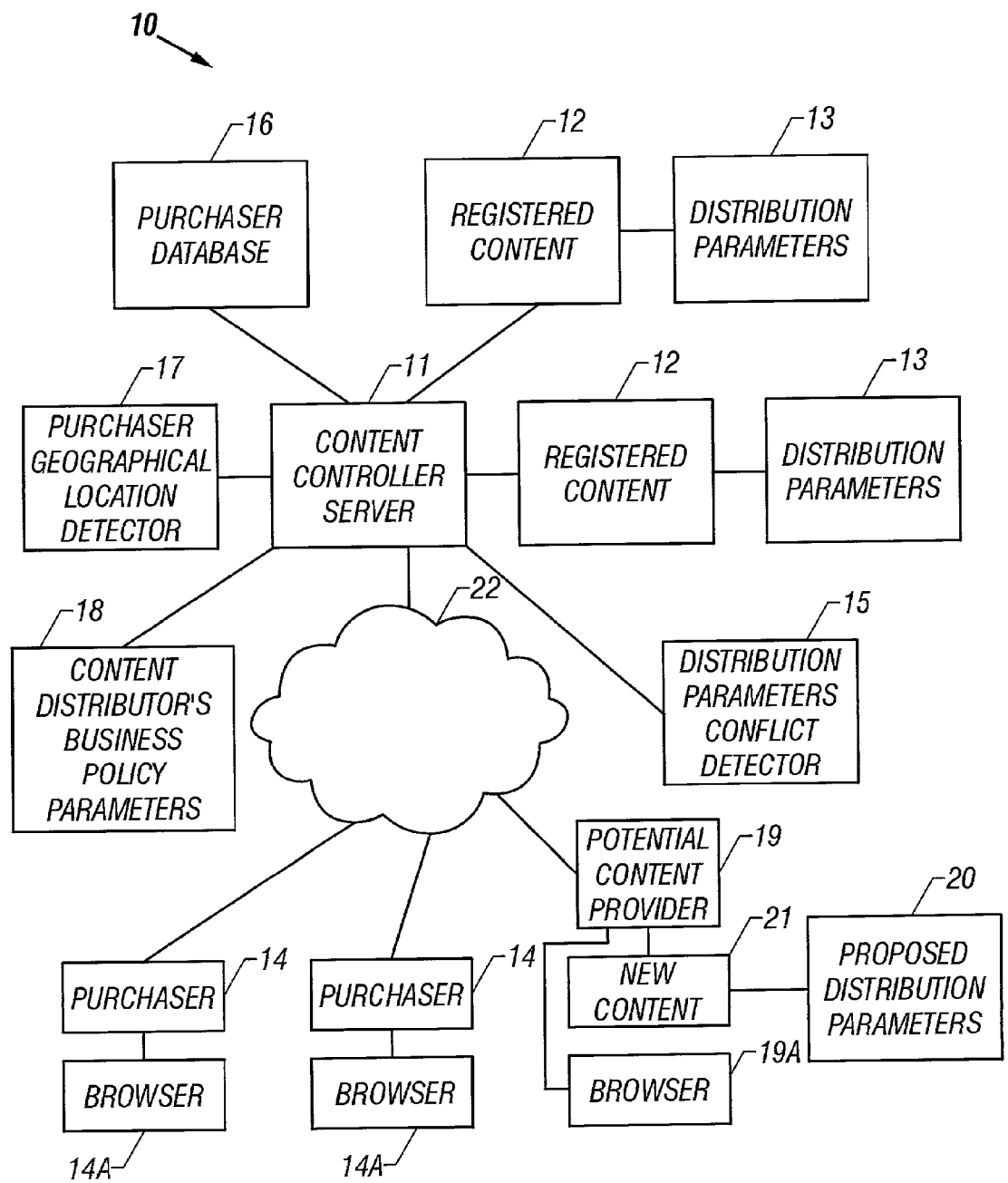
FIG. 1 is a schematic diagram showing the system of the present invention.

FIG. 1 is a schematic diagram showing the online content control system 10 of the present invention. An online purchaser 14 accesses a content distributor though a communications system or network 22, such as the Internet, to receive the online registered content 12 provided by content providers for distribution by the content distributor. A content distributor is a business enterprise that provides a Web site for distributing content to purchasers. A content distributor may distribute content provided by the content distributor, provided by another content provider, provided by multiple content providers or combinations thereof. A content controller server 11 communicates with multiple purchasers 14 through the communications network 22 and downloads or displays the registered content 12 to the online purchasers 14 when it does not violate the distribution parameters 13 specified by the content providers or the content distributor's business policy parameters 18. A registered purchaser database 16 contains records for each online purchaser including the online purchaser's identification, password used to access the content, credit card number, method of payment for receiving the content, other purchaser properties, and combinations thereof. Other purchaser properties may be, for example, geographical location, income, age, business classification, demography or combinations thereof. A purchaser's geographical location detector 17 may also reside on the content controller server 11 to identify the geographical location of a purchaser 14 from the purchaser's IP address. Under IPv4 (Internet Protocol, version 4), the content controller server can identify a purchaser's geographical location by using a reverse lookup on an address using a Domain Name Service (DNS). A DNS translates domain names into IP addresses. Under IPv6, which is currently under development, every purchaser will have a location attribute in the purchaser's IP address, which will simplify identifying the purchaser's geographical address by the content controller server 11.

A potential content provider 19 may also access the content controller server 11 to request distribution of new content 21. In this case, the potential content provider 19 submits proposed distribution parameters 20 for comparison with the existing distribution parameters 13 and the content distributor's business policy parameters by the policy conflict detector 15.

The registered contents 12, distribution parameters 13, the purchaser database 16, the purchaser's geographical location detector 17, the content distributor's business policy parameters 18 and the policy conflict detector 15 will preferably all reside on the content controller server 11.

The registered contents 12 to be distributed may be any type of content provided by a content provider for distribution by the content controller server 11. The content may include, for example, films, theatrical performances, sporting events, music performances, magazine subscriptions, newspaper subscriptions, newsletters, entertainment, information, video feeds, audio feeds, television broadcasts, radio broadcasts, news reports, or combinations thereof.

A potential content provider 19 specifies proposed distribution parameters 20 for the new contents 21. The potential content provider may connect to the content controller server 11 over the Internet 22 and specify the proposed distribution parameters 20 by using a graphical user interface (GUI). The GUI is preferably similar to a form that can be filled out using checklists, pull down menus and other standard features that enable the potential content provider to clearly specify the proposed distribution parameters 20 of the new content 21. The potential distribution parameters 20 may include, for example, pricing of the content for a purchaser 14, cost of distribution by the content distributor, time period for distribution of the content, geographical areas to distribute or not to distribute the content, the bandwidth over which the content may be distributed, purchaser properties targeted for distribution or blocked from distribution, content description and classification, exclusivity of distribution from competing content providers, and combinations thereof. The purchaser properties may include, for example, purchaser's age, income, geographical location, other demographic information, and combinations thereof.

Alternatively, the potential content provider may specify proposed distribution parameters 20 by negotiation with the content distributor, by written proposal, or by combinations thereof and then submit the proposed distribution parameters to the content controller server 11 in computer readable format.

The distribution parameter conflict detector 15 compares the proposed distribution parameters 20 with distribution parameters 13 of the registered content to ensure that no exclusivity or other requirement or constraint of the registered content distribution parameters would be violated if the new content were distributed. For example, if a live baseball game were being distributed, a proposal to distribute a soccer game at the same time may be a conflict if a distribution parameter for the baseball game stated that no other sporting events could be distributed during the time period of the baseball game. Another example might be that if a live theatrical performance were being distributed, a proposal to distribute a different live performance at the same time could be a conflict. An additional example of a conflict might be that sufficient distribution hardware is not available to distribute additional content when considering the design capacity of the content controller system 10 for downloading or displaying the content to purchasers. If the policy conflict detector 15 determines there is an exclusivity conflict, hardware availability conflict, or other conflict, then the new content would not be accepted for distribution without changes to the proposed distribution parameters to resolve the conflict.

The distribution parameter conflict detector 15 also compares the proposed distribution parameters 20 with the content distributor's business policy parameters 18 to ensure that the proposed content 21 and the proposed distribution parameters 20 complies with the content distributor's business policy parameters 18. The content distributor's business policy parameters may include, for example, copyright law considerations, objectionable content ban, purchaser demand for types of content, cost of distributing content, distribution hardware availability, and combinations thereof. For example, the content distributor may have a business policy parameter not to distribute political commentary and would therefore reject any request to distribute political commentary. Or the content distributor may know that a potential content provider has expressed intent to have content distributed that would be very profitable for the content distributor. In that situation, the content distributor may want to keep distribution hardware capacity available for the more profitable business opportunity and therefore reject a request that would reduce the available hardware capacity.

The communications network 22 is the medium used to provide communications links between various devices and computers connected together within the online content controller system 10. The communications network 22 may include permanent connections, such as wire or fiber optic cables, or temporary connections made through telephone or wireless communications. Online purchasers 14 and servers 11 may be represented by a variety of computing devices, such as mainframes, personal computers, personal digital assistants (PDAs), smart phones, etc. The online content controller system may include additional servers, clients, routers and other devices not shown. In the depicted example, the online content controller system 10 may include the Internet 22 with the online content controller system 10 representing a worldwide collection of networks and gateways that use the TCP/IP suite of protocols to communicate with one another. Of course, the online content controller system 10 may also include a number of different types of networks, such as, for example, an intranet, a local area network (LAN), or a wide area network (WAN).

The present invention may be implemented on a variety of hardware platforms and may be implemented in a variety of software environments. A typical operating system may be used to control program execution within the data processing system. Furthermore, although the preferred embodiment described below includes a "browser" at the purchaser 14 and potential content provider 19 as the agent exchanging data in the security protocols with the Web Application Server, the agent does not have to be a conventional browser, e.g., Netscape Navigator® or Microsoft Internet Explorer®. In order to secure the information transmitted to and from the server, the purchaser or potential content provider may be capable of Public Key Infrastructure (PKI) technology exchanged in a security protocol such as the Secure Sockets Layer (SSL) version 3.0 and above.

The content controller server 11 includes a conventional server software program, such as International Business Machines' Websphere®, for administering the content. The server software includes application programs that enable the content controller server 11 to manage the databases and execute policy conflict detection 15 or instructions based upon the distribution policies 13 in response to purchaser 14 access requests from the various online purchasers 14.

FIG. 1 further illustrates an online purchaser 14 or potential content provider 19 communicating with a content controller server 11 to access and view the registered contents 12. As illustrated, the online purchaser or potential content provider at a workstation 14, 19 seeks access over a computer network 22 to the online content 12 or other functions on the content controller server 11 located on a content controller server 11 through the workstation's web browser 14A, 19A. The computer network 22 may be the Internet, an intranet, or other network. The content controller server 11 may be a Web Application Server (WAS), a server application, a servlet process or the like. Optionally, the workstation 14, 19 submits the required information to identify the online purchaser or potential content provider as being authorized to access the online content 12. The information may include data such as a password or a combination of an online purchaser or potential content provider identification and password assigned by the content controller server 11. The content controller server 11 generates a graphical user interface that is displayed by the browser 14A, 19A providing the individual options to the online purchaser or potential content provider.

Figure 2:
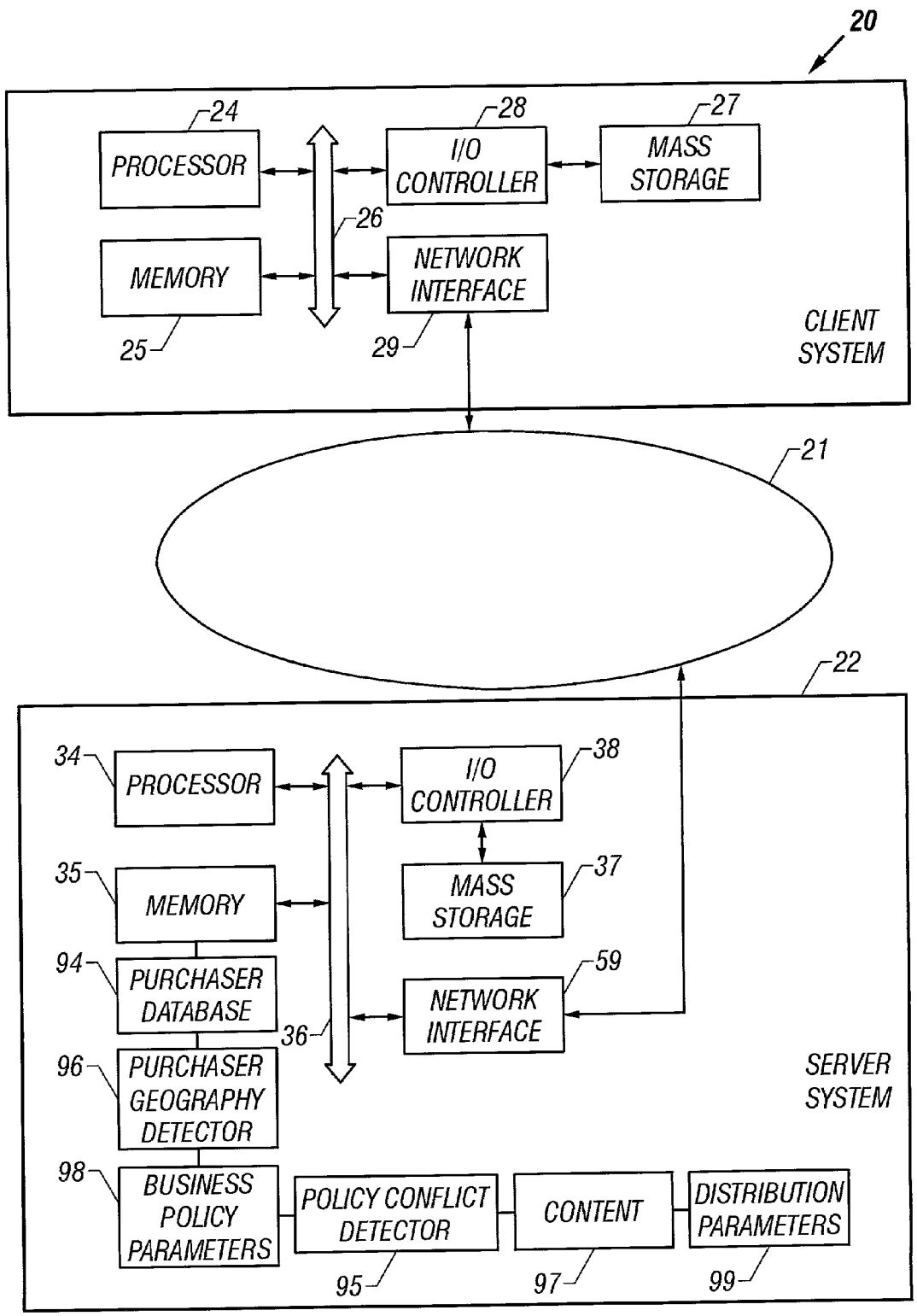
FIG. 2 is a schematic diagram illustrating an example of a content controller server system connected through a network.

FIG. 2 depicts an example of an online content controller server system connected through the Internet 21. In this example, a content controller server system 22 is connected through the Internet 21 to an online purchaser's system 20. The online purchaser's system 20 includes conventional components such as a processor 24, memory 25 (e.g. RAM), a bus 26, a mass storage device 27 (e.g. a magnetic hard disk or an optical storage disk) coupled to the bus 26 through an I/O controller 28 and a network interface 29, such as a conventional modem. The content controller server system 22 also includes conventional components such as a processor 34, memory 35 (e.g. RAM), a bus 36, a mass storage device 37 (e.g. a magnetic or optical disk) coupled to the bus 36 through an I/O controller 38 and a network interface 39, such as a conventional modem. It will be appreciated from the description below that the present invention may be implemented in software that is stored as executable instructions on a computer readable medium on the online purchaser's system, the potential content provider's system and the content controller server's system, such as mass storage devices 27 and 37 respectively, or in memories 25 and 35 respectively. The content controller server system 22 is shown having registered content 97, distribution parameters 99, policy parameter conflict detector 95, business policy parameters 98, purchaser geography detector 96 and purchaser database 94. The content controller server 22 is thus suitable for processing: (1) purchaser identification, (2) purchaser geographical location, (3) parameter conflict detection, (4) distribution parameter enforcement, and (5) registering potential content providers and purchasers.

Figure 3:
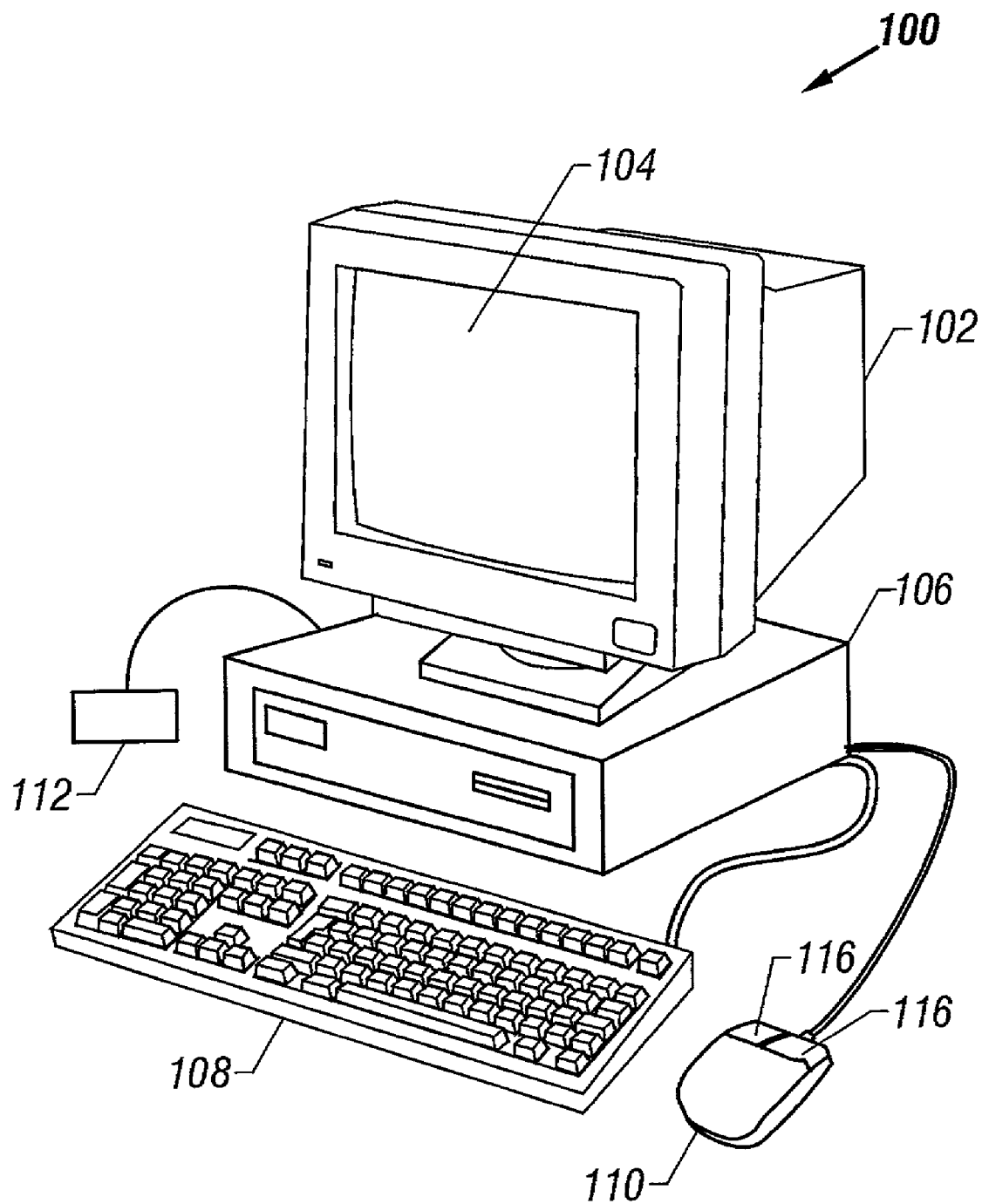
FIG. 3 is an example of a computer system in which the present invention may be implemented.

FIG. 3 shows an online purchaser's computer system 100 capable of running a browser. A similar system may be used for a potential content provider. The computer system 100 includes a display device 102 (such as a monitor), a display screen 104, a cabinet 106 (which encloses components typically found in a computer, such as CPU, RAM, ROM, video card, hard drive, sound card, serial ports, etc.), a keyboard 108, a mouse 110 and a modem 112. The mouse 110 may have one or more buttons, such as buttons 116. The computer requires some type of communication device such as modem 112 that allows computer system 100 to be connected to the Internet. Other possible communication devices include ethernet network cards.

Figure 4:
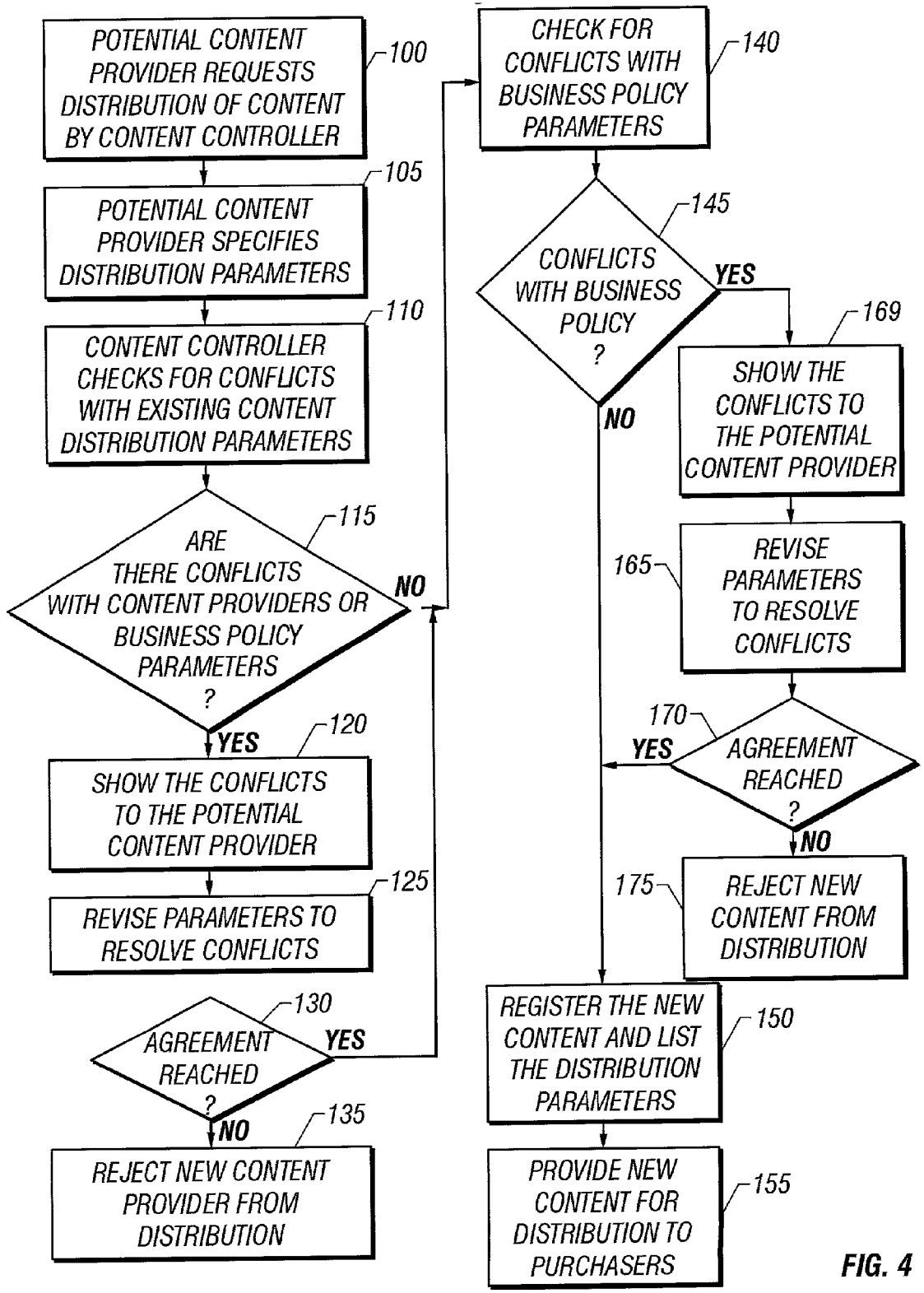
FIG. 4 is a flow chart of a method for determining whether new content conflicts with the exclusivity policies of existing content providers.

FIG. 4 is a flow chart of a method that may be executed on the system of FIG. 1. The method includes determining whether new content provided by a potential content provider conflicts with the exclusivity parameters of existing content providers. In state 100, a potential content provider 19 requests distribution of new content 21 from the content controller server 11. In state 105, using a graphical user interface (GUI), the potential content provider 19 specifies proposed distribution parameters 20 required to distribute the new content 21 of the potential content provider. In state 110, the content controller server 11 checks for exclusivity conflicts with the existing content providers' distribution parameters 13 using the parameter conflict detector 15. In state 115, if there are exclusivity conflicts, then in state 120, the content controller server notifies the potential content provider of the conflicts. In state 125, the potential content provider changes the proposed distribution parameters to comply with the exclusivity requirements of the existing distribution parameters. If, in state 130, the exclusivity conflicts are not resolved, then in state 135, the content controller server rejects the potential content provider and the new content is not distributed. If, in state 115, there are no exclusivity conflicts with the existing distribution parameters 13, or in state 130, agreement is reached, then in state 140, the content controller server 11 checks for conflicts with the content distributor's business policy parameters 18. If, in state 145, there are no conflicts with the content distributor's business policy parameters, then in state 150, the potential content provider is registered with the distribution parameters for the new content and in state 155, the registered content is provided for distribution to purchasers. If, in state 145, there are conflicts with the content distributor's business policy parameters 18, then in state 160, the content controller server 11 notifies the potential content provider 19 of the conflicts. In state 165, the potential content provider changes the proposed distribution parameters 20 to comply with the content distributor's business policy parameters requirements. If, in state 170, the conflicts are not resolved, then in state 175, the content controller server rejects the potential content provider and the new content is not distributed. If, in state 170, the conflicts are resolved, then the method follows the steps shown in states 150 through 155 as shown above.

Figure 5:
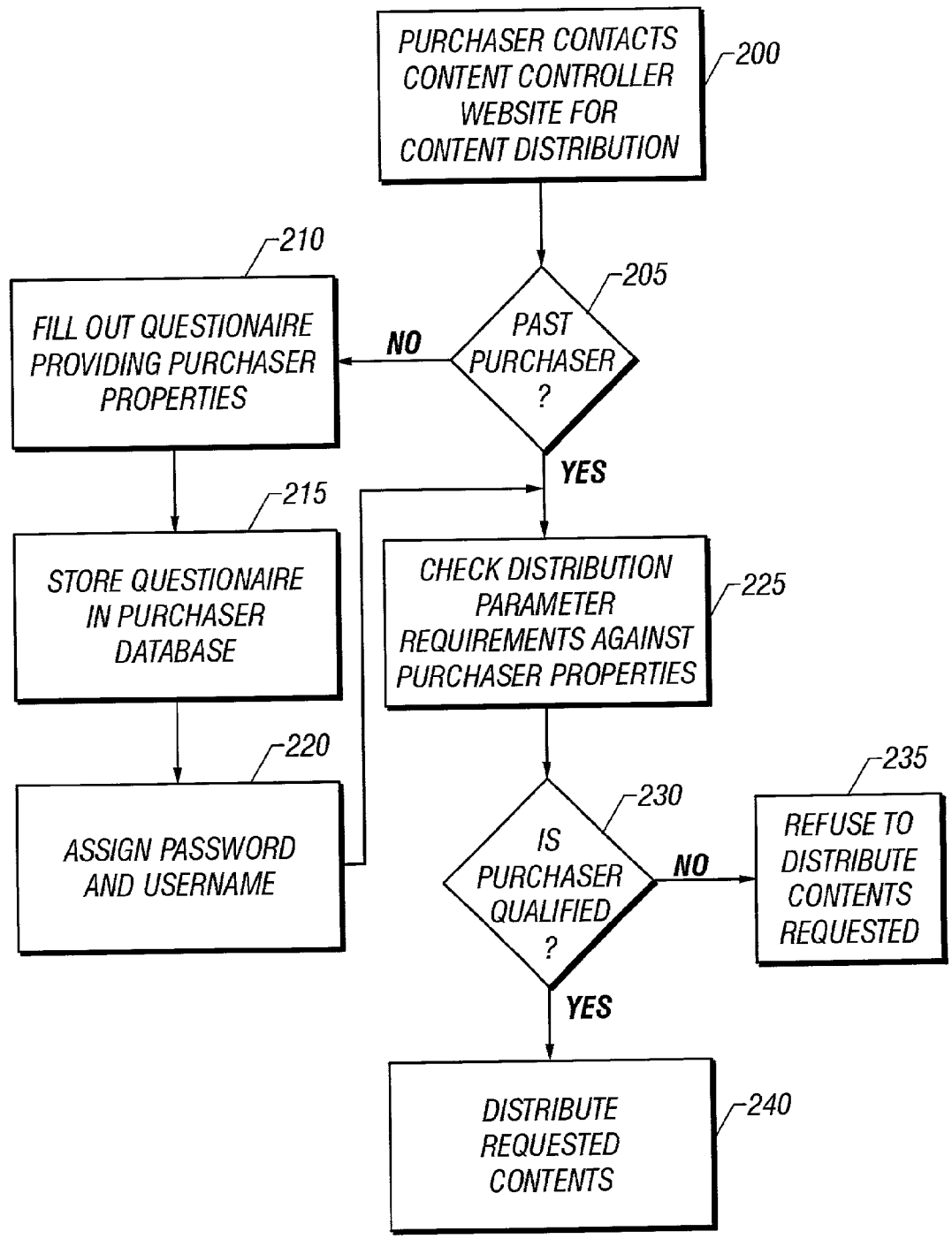
FIG. 5 is a flow chart of a method for distributing content to an online purchaser.

FIG. 5 is a flow chart of a method that may be executed on the system of FIG. 1 for distributing registered content to an online purchaser. In state 200, the purchaser 14 connects to the content controller server 11 to request the registered content 12 to be downloaded or otherwise presented for viewing. If, in state 205, the purchaser is a registered purchaser, then in state 225, the content controller server 11 checks to determine whether the purchaser properties meet the requirements of the distribution parameters 13 for the registered content 12 requested to presented. If, in state 230, the purchaser properties are consistent with those required by the distribution parameters, then in state 240, the registered content is displayed to the purchaser. If, in state 230, the purchaser properties are not qualified, then in state 235, the content controller refuses to download the requested registered content.

If, in state 205, the purchaser is a new customer, then in state 210, the new purchaser is requested to complete a questionnaire on line providing all the necessary demographic information and identification for the purchaser. In state 215, the demographic information is stored in the purchaser database 16 and, in state 220, the purchaser is provided with a password. The method then continues in steps 225 through 240 as discussed above. Alternatively, a purchaser may be granted access to the registered material without being a registered purchaser as long as the distribution parameters concerning providing registered material to purchasers are satisfied. For example, if a content provider is only interested in providing content to purchasers in a given geographical area, has no other distribution parameters for consideration, and the content controller server determines from the IP address of the purchaser that the purchaser is from the given geographical area, then the content controller can allow the purchaser access without requesting any additional information if access is free and payment information for the content distributor is not required.

While the foregoing is directed to the preferred embodiment of the present invention, other and further embodiments of the invention may be devised without departing from the basic scope thereof, and the scope thereof is determined by the claims that follow.

We claim:

1. A computer implemented method for making syndicated content available on-line with a content controller system, comprising:
   a. maintaining a computerized database of previously registered content items for distribution to an online content purchaser and of distribution parameters associated with each of the previously registered content items, wherein a plurality of the registered content items are simultaneously distributed when selected by a plurality of content purchasers;
   b. receiving a request to register an additional content item with associated distribution parameters;
   c. determining whether the additional content item can be registered for distribution by determining if there is a conflict between the distribution parameters of the additional content item and distribution parameters of previously registered content items; and
   d. registering the additional content item in the database if there is no conflict, wherein the additional content item becomes available for distribution to the online content purchaser.

2. The method of claim 1, further comprising:
   e. receiving a request from the online content purchaser to purchase a specific registered content item;
   f. identifying one or more properties of the online content purchaser;
   g. determining whether there is a conflict between the one or more properties of the online content purchaser and the distribution parameters associated with the specific registered content item; and
   h. delivering the specific registered content item to the online content purchaser if there is no conflict.

3. The method of claim 2, wherein the one or more properties of the online content purchaser are selected from purchaser identification, geographical location, income, age, business classification, demography or combinations thereof.

4. The method of claim 2, further comprising:
   i. allowing the online content purchaser to access the content controller system;
   j. collecting information from the purchaser; and
   k. storing the collected information in a purchaser database on the content controller system, wherein the collected information is selected from purchaser properties, credit card number, payment method or combinations thereof.

5. The method of claim 4, wherein purchaser properties are selected from purchaser identification, geographical location, income, age, business classification, demography or combinations thereof.

6. The method of claim 4, further comprising
   issuing a user identification and password to the purchaser for accessing the content controller system, and
   storing the user identification and password in the purchaser database.

7. The method of claim 2, wherein the one or more properties of the online content purchaser includes the geographical location of the purchaser and wherein the geographical location is identified by a method selected from asking the purchaser to provide the geographical location on a Web page and determining the location automatically through an IP address of the purchaser by the content controller system.

8. The method of claim 1, wherein the registered content items are selected from films, theatrical performances, sporting events, music performances, magazine subscriptions, newspaper subscriptions, newsletters, entertainment, information, video feeds, audio feeds, television broadcasts, radio broadcasts, news reports, and combinations thereof.

9. The method of claim 1, wherein the distribution parameters are selected from pricing of the content for a purchaser, cost of distribution by the content distributor, time period for distribution of the content, geographical areas to distribute or not to distribute the content the bandwidth over which the content may be distributed, purchaser properties targeted for distribution or blocked from distribution, content description and classification, exclusivity of distribution from competing content providers, and combinations thereof.

10. The method of claim 1, wherein the step of determining whether there is conflict between the distribution parameters of the additional content item and previously registered content items comprises:
   e. comparing the requested distribution parameters with the distribution parameters of the previously registered content items; and
   f. denying registration of the additional content item if the requested distribution parameters conflict with the distribution parameters of the previously registered content items.

11. The method of claim 10, further comprising:
g. receiving a modified request to register the additional content item with modified distribution parameters to remove conflict with the distribution parameters of the registered content, and
h. repeating steps c and d.

12. The method of claim 10, wherein the request to register provides the requested distribution parameters in computer readable format to the content controller server.

13. The method of claim 1, wherein the request to register is received from a content provider selected from a new content provider and a current content provider.

14. The method of claim 1, further comprising
e. comparing the requested distribution parameters with business parameters established for the content controller system; and
f. denying registration of the additional content item if the distribution parameters of the additional content item conflict with the business parameters.

15. The method of claim 14, wherein the business parameters are selected from copyright law considerations, objectionable content, purchaser demand for types of content, cost of distributing content, distribution hardware availability, and combinations thereof.

16. The method of claim 14, further comprising:
g. modifying the distribution parameters of the additional content item to remove conflict with the business parameters of the content controller system, and
h. repeating steps c through f.

17. A system for controlling online content distribution comprising:
a content controller server,
at least one database containing registered content that is available for purchase by an online content purchaser, registered content distribution parameters, content distributor business policy parameters, and purchaser parameters, and
a parameter conflict detector for determining whether the additional content item can be registered for distribution, wherein new content having distribution parameters not in conflict with the distribution parameters of registered content is registered and made available to purchasers and wherein a plurality of the registered content items are simultaneously distributed when selected by a plurality of content purchasers.

18. The system of claim 17, further comprising
a purchaser geography detector; and
a business policy parameter conflict detector, wherein new content having distribution parameters not in conflict with the business policy parameters is registered and made available to purchasers and wherein the purchaser geography detector identifies the purchaser's geographical location.

19. The system of claim 18, wherein the business policy parameters are selected from copyright law considerations, objectionable content ban, purchaser demand for types of content, cast of distributing content, distribution hardware availability and combinations thereof.

20. The system of claim 17, wherein at least one database comprises content selected from films, theatrical performances, sporting events, music performances, magazine subscriptions, newspaper subscriptions, newsletters, entertainment, information, video feeds, audio feeds, television broadcasts, radio broadcasts, news reports, or combinations thereof.

21. The system of claim 17, wherein the distribution parameters are selected from distribution price, time period for distributing content, bandwidth used for distributing content, purchaser properties, content description and classification and combinations thereof.

22. The system of claim 21, wherein purchaser properties are selected from purchaser identification, geographical location, income, age, business classification, demography or combinations thereof.

23. A computer program product including instructions embodied on a computer readable medium, the instructions comprising:
a. maintaining instructions for maintaining a computerized database of previously registered content items for distribution to an online content purchaser and of exclusive distribution parameters associated with each of the previously registered content items, wherein a plurality of the registered content items are simultaneously distributed when selected by a plurality of content purchasers;
b. receiving instructions for receiving a request to register an additional content item with associated exclusive distribution parameters;
c. determining instructions for determining whether the additional content item can be registered for distribution by determining if there is a conflict between the exclusive distribution parameters of the additional content item and exclusive distribution parameters of previously registered content items; and
d. registering instructions for registering the additional content item if there is no conflict, wherein the additional content item becomes available for distribution to the online content purchaser.

24. The computer program product of claim 23, further comprising:
e. receiving instructions for receiving a request from the online content purchaser to purchase a specific registered content item;
f. identifying instructions for identifying one or more properties of the online content purchaser;
g. determining instructions for determining whether there is a conflict between the one or more properties of the online content purchaser and the exclusive distribution parameters associated with the specific registered content item; and
h. delivering instructions for delivering the specific registered content item to the online content purchaser if there is no conflict.

25. The computer program product of claim 24, wherein the one or more properties of the online content purchaser are selected from purchaser identification, geographical location, income, age, business classification, demography or combinations thereof.

26. The computer program product of claim 24, further comprising:
i. allowing instructions for allowing the online content purchaser to access the content controller system;
j. collecting instructions for collecting information from the purchaser; and
k. storing instructions for storing the collected information in a purchaser database an the content controller system, wherein the collected information is selected from purchaser properties, credit card number, payment method or combinations thereof.

27. The computer program product of claim 26, wherein purchaser properties are selected from purchaser identification, geographical location, income, age, business classification, demography or combinations thereof.

28. The computer program product of claim 26, further comprising
   issuing instructions for issuing a user identification and password to the purchaser for accessing the content controller system, and
   storing instructions for storing the user identification and password in the purchaser database.

29. The computer program product of claim 24, wherein the one or more properties of the online content purchaser includes the geographical location of the purchaser and wherein the geographical location is identified by a method selected from asking the purchaser to provide the geographical location on a Web page and determining the location automatically through an IP address of the purchaser by a content controller system.

30. The computer program product of claim 23, wherein the registered content items are selected from films, theatrical performances, sporting events, music performances, magazine subscriptions, newspaper subscriptions, newsletters, entertainment, information, video feeds, audio feeds, television broadcasts, radio broadcasts, news reports, and combinations thereof.

31. The computer program product of claim 23, wherein the exclusive distribution parameters are selected from pricing of the content for a purchaser, cost of distribution by the content distributor, time period for distribution of the content, geographical areas to distribute or not to distribute the content, the bandwidth over which the content maybe distributed, purchaser properties targeted for distribution or blocked from distribution, content description and classification, exclusivity of distribution from competing content providers, and combinations thereof.

32. The computer program product of claim 23, wherein the determining instructions for determining whether there is conflict between the exclusive distribution parameters of the additional content item and the previously registered content items comprises:
   e. comparing instructions for comparing the requested exclusive distribution parameters with the exclusive distribution parameters of the previously registered content items; and
   f. denying instructions for denying registration of the additional content item if the exclusive distribution parameters of the additional content item conflict with the exclusive distribution parameters of the previously registered content items.

33. The computer program product of claim 32, further comprising:
   g. receiving instructions for receiving a modified request to register the additional content item with modified exclusive distribution parameters to remove conflict with the exclusive distribution parameters of the registered content, and
   h. repeating instructions c and d.

34. The computer program product of claim 32, wherein the request to register provides the requested exclusive distribution parameters in computer readable format to the content controller server.

35. The computer program product of claim 23, wherein the request to register is received from a content provider selected from a new content provider and a current content provider.

36. The computer program product of claim 23, further comprising
   e. comparing instructions for comparing the requested exclusive distribution parameters with business parameters established for a content controller system; and
   f. denying instructions for denying registration of the additional content item if the exclusive distribution parameters of to additional content item conflict with the business parameters.

37. The computer program product of claim 36, wherein the business parameters are selected from copyright law considerations, objectionable content, purchaser demand for types of content, cost of distributing content, distribution hardware availability, and combinations thereof.

38. The computer program product of claim 36, further comprising:
   g. modifying instructions for modifying the exclusive distribution parameters of the additional content item to remove conflict with the business parameters of the content controller system, and
   h. repeating instructions c through f.

39. A computer implemented method for making syndicated content available on-line with a content controller system, comprising:
   a. maintaining a computerized database of previously registered content items for distribution to an online content purchaser and of distribution parameters associated with each of the previously registered content items, wherein the distribution parameters comply with a site policy and, wherein a plurality of the registered content items are simultaneously distributed when selected by a plurality of content purchasers;
   b. receiving a request to register an additional content item with associated distribution parameters;
   c. comparing the requested distribution parameters with business parameters that define the site policy for determining whether the additional content item can be registered for distribution;
   d. registering the additional content item in the database if there is no conflict between the requested distribution parameters and the business parameters, wherein the additional content item becomes available to the online content purchaser.

40. The method of claim 39, wherein the registered content items are selected from films, theatrical performances, sporting events, music performances, magazine subscriptions, newspaper subscriptions, newsletters, entertainment, information, video feeds, audio feeds, television broadcasts, radio broadcasts, news reports, and combinations thereof.

41. The method of claim 39, wherein the distribution parameters are selected from pricing of the content for a purchaser, cost of distribution by the content distributor, time period for distribution of the content, geographical areas to distribute the content, the bandwidth over which the content may be distributed, purchaser properties targeted for distribution or blocked from distribution, content description and classification, exclusivity of distribution from competing content providers, and combinations thereof.

42. The method of claim 39, wherein the business parameters are selected from copyright law considerations, objectionable content, purchaser demand for types of content, cost of distributing the content, price of the content, time period for distribution of the content, geographical areas to distribute the content, distribution hardware availability, exclusivity of distribution from competing content providers, content description and classification, and combinations thereof.

43. The method of claim 39, further comprising:
   e. modifying the distribution parameters of the additional content item to remove conflict with the business parameters; and
   f. repeating steps c through d.

44. The method of claim 39, further comprising:
receiving a request from the online content purchaser to purchase a specific registered content item;
identifying one or more properties of the online content purchaser;
determining whether there is a conflict between the one or more properties of the online content purchaser and the distribution parameters associated with the specific registered content item; and
delivering the specific registered content item to the online content purchaser if there is no conflict.

45. The method of claim 44, wherein the one or more properties of the online content purchaser are selected from purchaser identification, geographical location, income, age, business classification, demography or combinations thereof.

46. The method of claim 44, further comprising:
allowing the online content purchaser to access the content controller system;
collecting information from the purchaser; and
storing the collected information in a purchaser database on the content controller system, wherein the collected information is selected from purchaser properties, credit card number, payment method or combinations thereof.

47. A computer program product including instructions embodied on a computer readable medium, the instructions comprising:
a. maintaining instructions for maintaining a computerized database of previously registered content items for distribution to an online content purchaser and of distribution parameters associated with each of the previously registered content items, wherein the distribution parameters comply with a site policy and, wherein a plurality of the registered content items are simultaneously distributed when selected by a plurality of content purchasers;
b. receiving instructions for receiving a request to register an additional content item with associated distribution parameters;
c. comparing instructions for comparing the requested distribution parameters with business parameters that define the site policy for determining whether the additional content item can be registered for distribution;
d. registering instructions for registering the additional content item in the database if there is no conflict between the requested distribution parameters and the business parameters, wherein the additional content item becomes available to the online content purchaser.

48. The computer program product of claim 47, wherein the registered content items are selected from films, theatrical performances, sporting events, music performances, magazine subscriptions, newspaper subscriptions, newsletters, entertainment, information, video feeds, audio feeds, television broadcasts, radio broadcasts, news reports, and combinations thereof.

49. The computer program product of claim 47, wherein the distribution parameters are selected from pricing of the content for a purchaser, cost of distribution by the content distributor, time period for distribution of the content, geographical areas to distribute the content, the bandwidth over which the content may be distributed, purchaser properties targeted for distribution or blocked from distribution, content description and classification, exclusivity of distribution from competing content providers, and combinations thereof.

50. The computer program product of claim 47, wherein the business parameters are selected from copyright law considerations, objectionable content, purchaser demand for types of content, cost of distributing the content, price of the content, time period for distribution of the content, geographical areas to distribute the content, distribution hardware availability, exclusivity of distribution from competing content providers, content description and classification, and combinations thereof.

51. The computer program product of claim 47, further comprising:
e. modifying instructions for modifying the distribution parameters of the additional content item to remove conflict with the business parameters; and
f. repeating instructions for repeating steps c through d.

52. The computer program product of claim 47, further comprising:
receiving instructions for receiving a request from the online content purchaser to purchase a specific registered content item;
identifying instructions for identifying one or more properties of the online content purchaser;
determining instructions for determining whether there is a conflict between the one or more properties of the online content purchaser and the distribution parameters associated with the specific registered content item; and
delivering instructions for delivering the specific registered content item to the online content purchaser if there is no conflict.

53. The computer program product of claim 52, wherein the one or more properties of the online content purchaser are selected from purchaser identification, geographical location, income, age, business classification, demography or combinations thereof.

54. The computer program product of claim 52, further comprising:
allowing instructions for allowing the online content purchaser to access the content controller system;
collecting instructions for collecting information from the purchaser; and
storing instructions for storing the collected information in a purchaser database on the content controller system, wherein the collected information is selected from purchaser properties, credit card number, payment method or combinations thereof.

* * * * *

UNITED STATES PATENT AND TRADEMARK OFFICE
CERTIFICATE OF CORRECTION

PATENT NO.   : 6,976,010 B2
DATED        : December 13, 2005
INVENTOR(S)  : Dwip N. Banerjee et al.

It is certified that error appears in the above-identified patent and that said Letters Patent is hereby corrected as shown below:

Column 10,
Line 52, replace "the content the bandwidth" with -- the content, the bandwidth --.

Column 11,
Line 57, replace "cast" with -- cost --.

Column 14,
Line 3, replace "to" with -- the --.

Signed and Sealed this

Second Day of May, 2006

JON W. DUDAS
*Director of the United States Patent and Trademark Office*